(12) United States Patent
Rashkovskiy (10) Patent No.: US 7,383,563 B1
(45) Date of Patent: Jun. 3, 2008

(54) AUTOMATIC CHANNEL SWITCHING

(75) Inventor: Oleg B. Rashkovskiy, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,216

(22) Filed: Dec. 29, 1999

(51) Int. Cl.
   *H04N 7/173* (2006.01)
(52) U.S. Cl. .......................... 725/58; 725/139
(58) Field of Classification Search ............. 725/32, 725/34, 37, 40, 41, 135, 58
   See application file for complete search history.

(56) References Cited

U.S. PATENT DOCUMENTS

| | | | | |
|---|---|---|---|---|
| 4,230,990 A | * | 10/1980 | Lert et al. ...................... 405/66 |
| 5,247,364 A | | 9/1993 | Banker et al. ............ 358/191.1 |
| 5,481,296 A | * | 1/1996 | Cragun et al. ............... 725/136 |
| 5,589,892 A | | 12/1996 | Knee et al. |
| 5,594,551 A | * | 1/1997 | Monta .......................... 386/92 |
| 5,659,366 A | * | 8/1997 | Kerman ........................ 725/34 |
| 5,699,107 A | * | 12/1997 | Lawler et al. ................. 725/58 |
| 5,809,204 A | | 9/1998 | Young et al. .................. 386/83 |
| 5,815,145 A | * | 9/1998 | Matthews, III ............... 725/41 |
| 5,818,441 A | | 10/1998 | Throckmorton et al. ..... 345/328 |
| 5,867,205 A | * | 2/1999 | Harrison ....................... 725/38 |
| 5,900,868 A | * | 5/1999 | Duhault et al. ................ 725/42 |
| 5,907,322 A | * | 5/1999 | Kelly et al. .................... 725/51 |
| 6,049,333 A | * | 4/2000 | LaJoie et al. ................ 345/718 |
| 6,055,413 A | * | 4/2000 | Morse et al. ............... 340/7.43 |
| 6,169,845 B1 | * | 1/2001 | Yamamoto .................... 386/92 |
| 6,172,677 B1 | * | 1/2001 | Stautner et al. ............. 345/716 |
| 6,263,502 B1 | * | 7/2001 | Morrison et al. ............. 725/47 |
| 6,349,410 B1 | * | 2/2002 | Lortz .......................... 725/110 |
| 6,412,111 B1 | | 6/2002 | Cato .......................... 725/137 |
| 6,522,342 B1 | * | 2/2003 | Gagnon et al. ............. 345/716 |
| 6,536,041 B1 | * | 3/2003 | Knudson et al. .............. 725/39 |
| 6,542,695 B1 | * | 4/2003 | Akiba et al. ................. 386/125 |
| 2002/0032907 A1 | * | 3/2002 | Daniels ........................ 725/51 |

FOREIGN PATENT DOCUMENTS

| | | |
|---|---|---|
| EP | 0 854 645 A2 | 7/1998 |
| EP | 0 912 053 A1 | 4/1999 |

(Continued)

OTHER PUBLICATIONS

Todd Altman and Edward Harrison, U.S. Appl. No. 09/196,262, filed Nov. 19, 1998, entitled "Automatic Channel Switching".

*Primary Examiner*—Andrew Y Koenig
(74) *Attorney, Agent, or Firm*—Trop, Pruner & Hu, P.C.

(57) ABSTRACT

A system allows a user to select prompts during the viewing of video transmission on a first channel about events that may have occurred in the course of a transmission on a second channel. The user may be provided with a mechanism, such as a remote control, that allows the user to switch to the second channel after receiving the prompt on the first channel. Since the second channel is continuously recorded, the user can switch to the second channel to view a recorded portion of the transmission on the second channel up to the event on the second channel, to enable the user to decide whether to switch to view the second channel.

16 Claims, 8 Drawing Sheets

---

126

Games Available for Sunday September 7th

| Game | CH | On/Off | Type | Options |
|---|---|---|---|---|
| Giants vs. Cowboys | 41 | On | Time-R | 2:00 min. Remaining |
| Cardinals vs. 49ers | 42 | On | Score | - |
| Packers vs. Lions | 45 | Off | - | - |
| Redskins vs. Saints | 48 | On | Auto | 5 minutes |
| Dolphins vs. Jets | 53 | On | Diff | <7 points |

FOREIGN PATENT DOCUMENTS

| | | | |
|---|---|---|---|
| EP | 0 952 737 A2 | | 10/1999 |
| FR | EP 0912053 | * | 4/1999 |
| WO | WO 96/27840 | * | 9/1966 |
| WO | WO 96/27840 | * | 9/1996 |
| WO | WO 97/19555 | * | 5/1997 |
| WO | WO 99/11065 | * | 3/1999 |

* cited by examiner

| Games Available for Sunday September 7th | | | | |
|---|---|---|---|---|
| Game | CH | On/Off | Type | Options |
| Giants vs. Cowboys | 41 | On | Time-R | 2:00 min. Remaining |
| Cardinals vs. 49ers | 42 | On | Score | - |
| Packers vs. Lions | 45 | Off | - | - |
| Redskins vs. Saints | 48 | On | Auto | 5 minutes |
| Dolphins vs. Jets | 53 | On | Diff | <7 points |

AUTOMATIC CHANNEL SWITCHING

BACKGROUND

This invention relates generally to the transmission and receipt of one or more video transmissions such as television programs.

Enhanced television program transports such as satellite and cable systems provide the user with a vast number of television program options. In many cases, the number of options exceeds the user's ability to keep track of what programs the user would like to view. Thus, the user watches one program and misses another program which may be broadcast in the same time period.

An electronic program guide (EPG) allows the user to select for viewing one of a plurality of programs displayed on a graphical user interface. Thus, the EPG facilitates the selection of programs for viewing.

A need continues to exist for a way to enable the user to keep track of various programs which may be broadcast during the same time interval or during a given time interval in which the user may wish to keep track of more than one program. For example, in some satellite systems, a large number of sporting events are broadcast at the same time. For example, football games from a variety of localities across a geographic area may be displayed in overlapping time frames. Many sports enthusiasts would like to keep track of the progress of the games on different channels, but it is difficult to keep track of what broadcasts are available, at the same time the user is watching a given broadcast.

Conventionally, users have attempted to overcome this problem by constantly switching back to the program guide in order to determine what other programs are available. This is time consuming and annoying since the television picture is constantly being switched.

Thus, there is a continuing need for a better way to enable users to monitor a plurality of transmissions at one time.

SUMMARY

In accordance with one embodiment, a first transmission is monitored while a receiver is tuned to receive a second transmission. A notification is generated when a predetermined event occurs during the first transmission. The method includes enabling the display of a portion of the second transmission before the event occurred.

Other aspects are set forth in the accompanying detailed description and claims.

DETAILED DESCRIPTION

Figure 1:
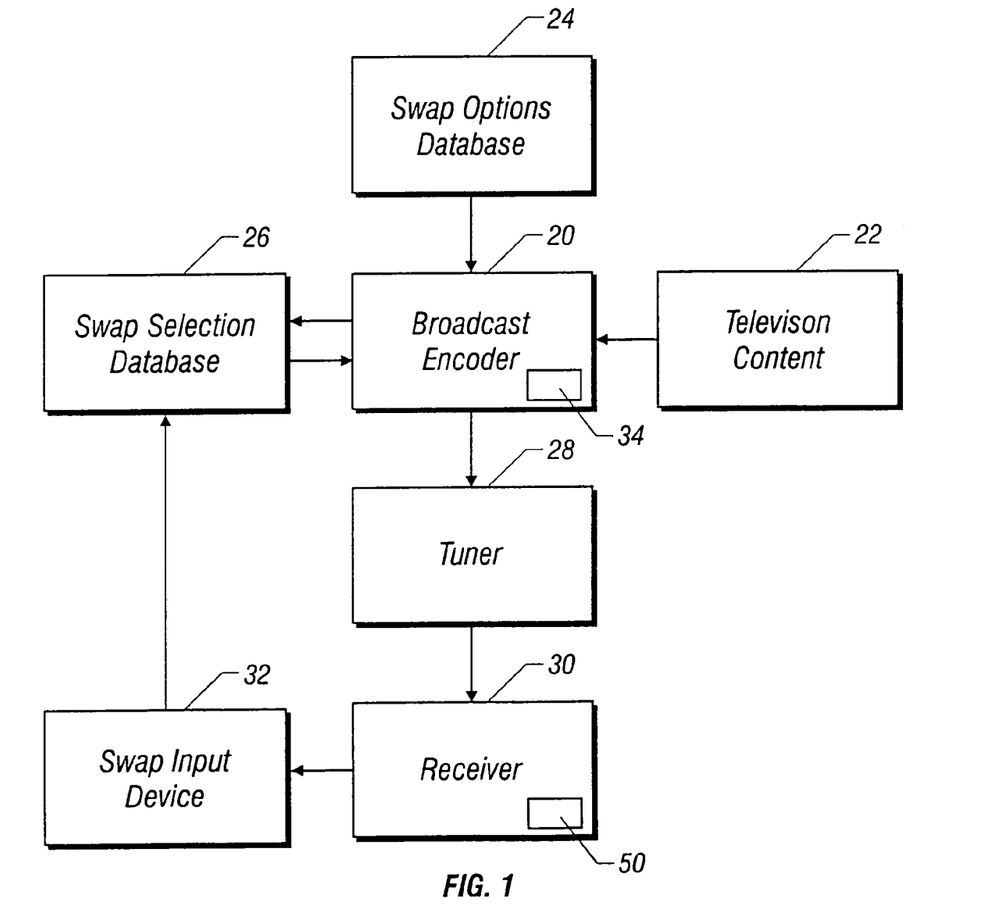
FIG. 1 is a block diagram of one embodiment of the present invention.

A system for transmitting and receiving video transmissions, shown in FIG. 1, may be used to implement embodiments in which the video transmission is provided by a wired or wireless broadcast or by any of a variety of multicasting systems, including systems which transmit over satellites, cable systems, the Internet, or through computer networks.

A video transmission facility, such as the broadcast encoder 20, may transmit video to a plurality of tuners, including the tuner 28 which is tuned to receive the transmission. The tuner 28 passes the received transmission to a receiver 30 which decodes the transmission.

The transmission may include, for example, a wireless television broadcast together with additional information which may include script. Script may be a command list that can be executed without user interaction. The receiver may respond to the transmitted script by inputting information to a swap input device 32. The swap input device 32 may in turn communicate with a swap selection database 26 associated with the broadcast encoder 20. Thus, the broadcast encoder 20 may encode or combine television content 22, and in some embodiments, information from a swap option database 24, and transmit this information to the receiver 30.

The swap option database 24 affords the receiver user the opportunity to select information about other transmissions which may occur during a particular transmission which the user intends to view. Thus, the swap option database may allow the receiver user to select information about programs that are being transmitted while another program is in progress. For example, the user of the receiver may wish to watch a first football broadcast but may wish to be notified about events occurring in a second football broadcast or other event. The available events that give rise to a user notification may be stored in the swap options database 24. The user may select, using the swap input device 32, various conditions which may occur in the second broadcast which would cause a notification to be issued to the user in the course of the first broadcast. The user's selections may then be stored in the swap selection database 26.

The user, in response to that notification, may elect to switch to view the second program. Thus, for example, the receiver may receive an on-screen prompt from the broadcast encoder 20 swap selection database 26 that a second broadcast is about to end in two minutes. The user then would be given the option to switch channels to view the second broadcast. Alternatively, the second program may automatically be displayed in a picture-in-picture overlay over the first program in response to a notification.

The display of the second program in a picture-in-picture overlay may involve using a different size picture-in-picture overlay for the replay of the second program compared to a normal picture-in-picture display. In addition, the second program may be overlaid in a transparent mode enabling the viewer to look through the overlay to see the underlying program. Of course, a full screen replay may also be utilized. Moreover, while the second program is being replayed in a full screen mode, the first program could be stored or shown in a picture-in-picture mode. Thus, if the first program is stored while the portion of the second program is being viewed, the viewer may go back and see any portion of the first program that was missed while viewing the second program and determining whether to switch to the second program.

Figure 2:
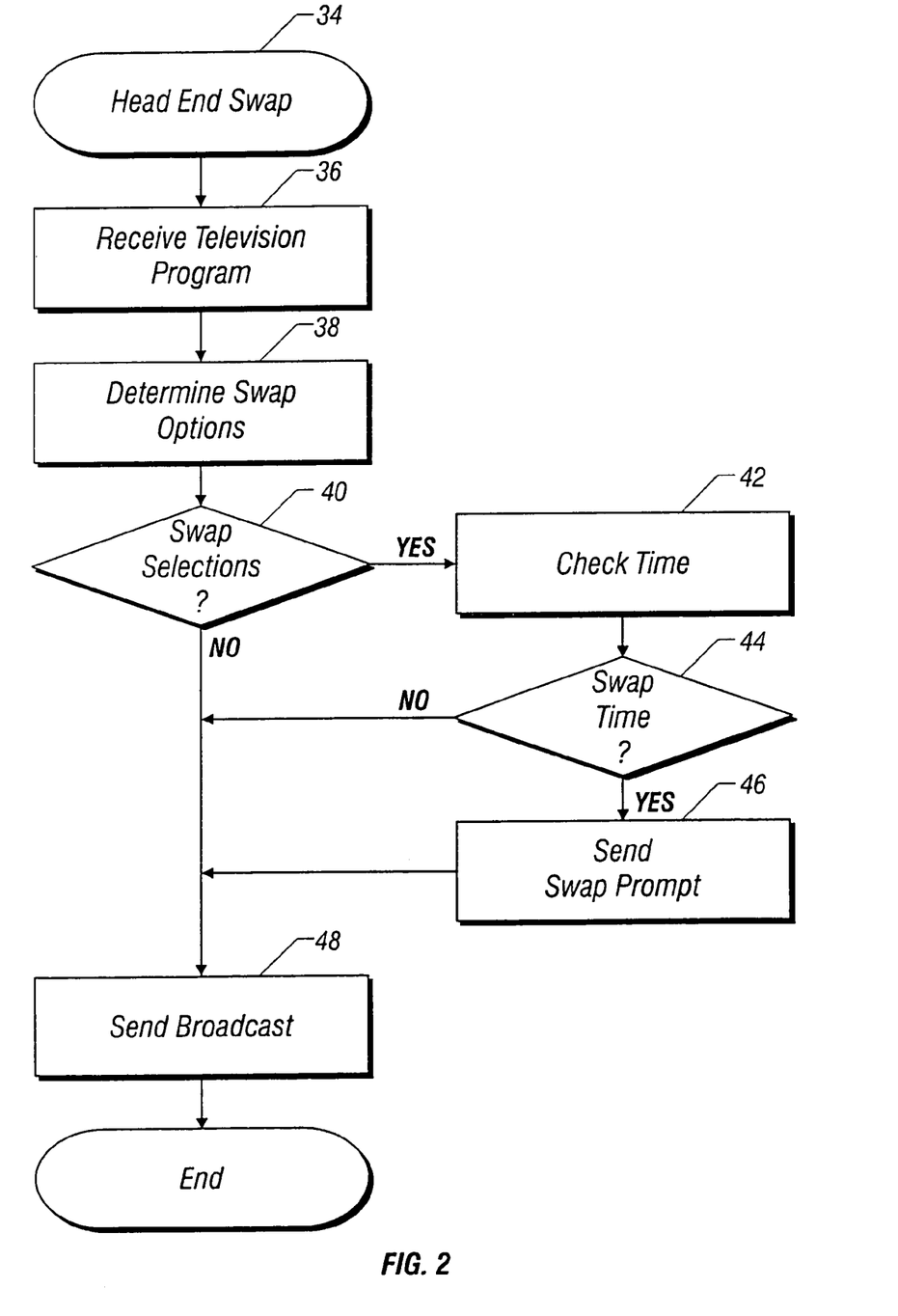
FIG. 2 is a flow chart for one embodiment of software that may be used in the broadcast encoder shown in FIG. 1.

Referring now to FIG. 2, software 34 for implementing the system may be stored in a memory in the broadcast encoder 20, which may be a computer server in one embodiment of the present invention. The software 34 begins by receiving transmission information such as television program information from the television content provider 22 (block 36). The encoder 20 also may determine what swap options are available for a particular broadcast from the swap options database 24 (block 38). The appropriate content transmission and the corresponding swap options may then be broadcast as indicated in FIG. 1. Swap options may include the options that would be available to the viewer of one broadcast to obtain information about another ongoing broadcast in the same general time interval.

The receiver 30 user may make swap selections, through the input device 32, at any time, for example among the options afforded by the broadcast encoder 20. Those selections may be stored in the database 26. If the user makes a swap selection in response to a query afforded at diamond 40 in FIG. 2, a flag is set. The software continually checks the time, as indicated in block 42, to see if the time corresponds to a time when a given swap option should be invoked. For example, in connection with a swap option that provides a message to the viewer when two minutes are remaining in another broadcast, the software checks to determine whether that time has arrived. If the time has arrived, as indicated in diamond 44, a prompt is sent to the receiver 30 to prompt the user to indicate whether the user wishes to "swap" or change channels to receive the other broadcast, as indicated in block 46.

Figure 5:
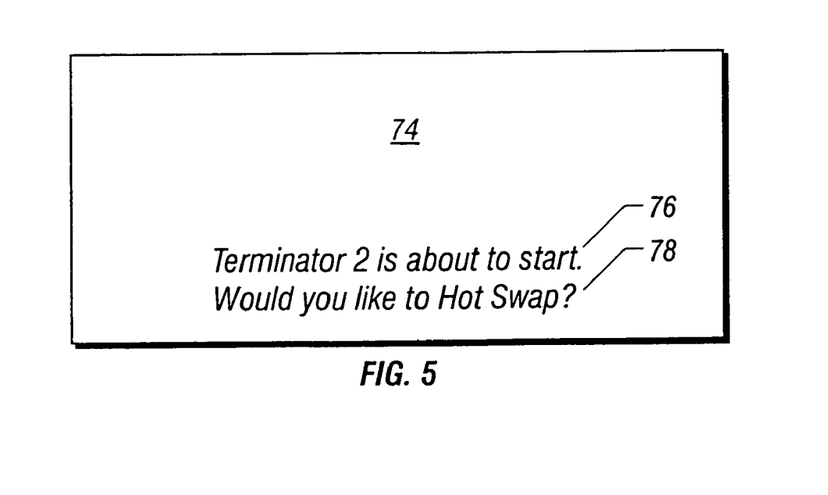
FIG. 5 is a front elevational view of a display screen associated with the receiver shown in FIG. 1.

An example of a display screen 74 prompt message, shown in FIG. 5, includes information 76 about the other transmission on a second channel and a query 78 as to whether the user would like to switch to the other transmission. If the user elects to switch to the other transmission, the channel is switched automatically, as indicated in block 48, in FIG. 2. Otherwise, the user continues to receive the same transmission that he or she was already viewing and the prompt message is removed after a predetermined time interval.

Rather than simply transmitting the content on a second channel, the broadcast encoder can send the portion of the second channel content that proceeded the occurrence of the event which generated the prompt. In this way, the viewer can judge whether or not the viewer wishes to view the second channel based on a clear understanding of the event itself. Thus, for example, a predetermined portion of the broadcast on the second channel that preceded the event may be transmitted for viewing.

In accordance with one embodiment of the present invention, a short portion of the transmission on the second channel preceding the event, such as forty-five seconds, may be provided to the viewer upon detection of an event. In this way, the viewer can understand what happened to generate the event and can determine whether or not to watch the second channel. In another embodiment of the present invention, the viewer may be provided with a short portion preceding the event and a short portion after the event to enable the viewer to get a complete understanding of the event and to make a decision about whether to switch to real time display of the second channel. In one embodiment, the portion from the second channel may be presented in a picture-in-picture display overlaid on the display of the first channel.

Thus, in the embodiment just described, the software for controlling the swap option is provided on the head end at the transmitter or broadcast station. The available swap options are transmitted to the receiver and the user selections at the receiver may be transmitted through a side band channel back to the broadcaster. In this way the broadcast station 20 keeps track of all the timing information and the user selections and provides the prompts and switching capabilities as requested. Of course, these same controls could also be provided at the receiver end as well, for example, by providing a plurality of tuners in the receiver each monitoring a different broadcast or other video transmission. Also, the same controls could be implemented by a content aggregation such as a cable provider, a satellite broadcasts, or the like.

Figure 3:
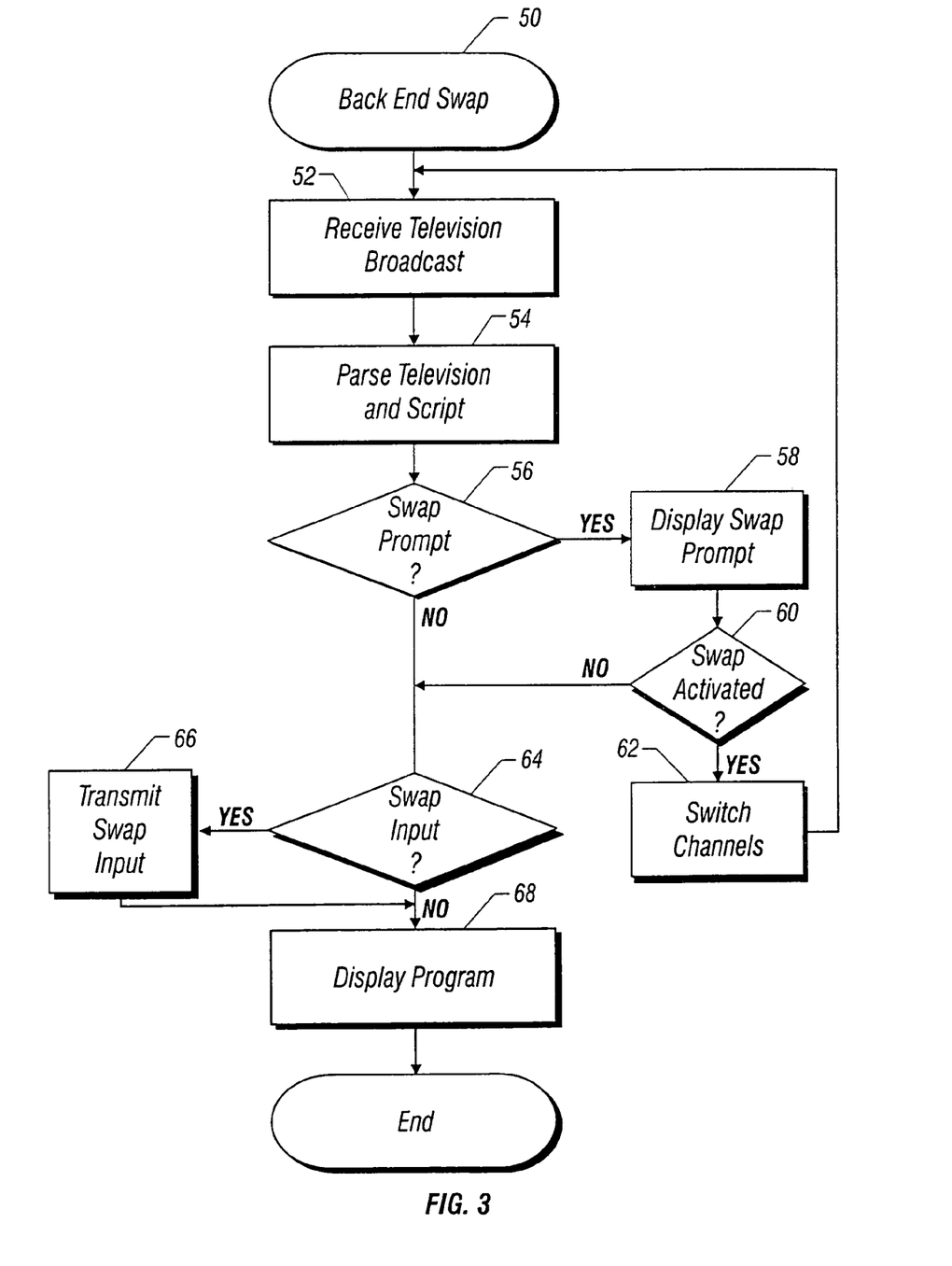
FIG. 3 is a flow chart for one embodiment of software that may be used with the receiver of FIG. 1.

FIG. 3 illustrates a flow for software 50 which may be stored in a memory on the receiver 30 as indicated in FIG. 1. In FIG. 3, the receiver 30 may receive a given television broadcast or other video transmission as indicated in block 52. The television information and the accompanying broadcast script may be parsed as suggested in block 54. If the script includes a swap prompt, as shown in diamond 56, the prompt may be displayed on the receiver's screen as indicated in block 58. Next a check determines whether the user activated the swap option, as indicated in diamond 60. If so, the channels are switched, as indicated in block 62, and the flow cycles back to the beginning.

If the user elects to view the transmission on the other channel, instead of viewing the transmission on the other channel in real time, the viewer may be provided a recorded slice of the transmission on the other channel that preceded, by a predetermined time period, the event which triggered the swap prompt. The duration of this time interval may be programmed by the user. Thus, when the viewer elects to swap, the viewer is provided with a predetermined recorded portion of the transmission on the other channel which preceded the event. In one embodiment of the present invention, the prerecorded portion may include a forty-five second portion preceding the event together with forty-five seconds after the event. In other words, the second channel is continually recorded either at the receiver or at the broadcast encoder. When a swap is elected, the forty-five seconds preceding the swap event are played and the forty-five seconds that occurred (during the replay of the first forty-five second clip) after the event, may also be played in one embodiment of the present invention. Thus, in one example, the viewer may be provided with the forty-five seconds preceding the event and the forty-five seconds after the event. This allows the user to make an informed decision about whether to view the second channel.

In a system which records the information on the receiver, the incoming broadcast on the second channel which is being monitored may be continuously recorded. In one embodiment of the present invention, a first in last out memory may be utilized to continuously store incoming video on the second channel. In this way, a short portion of that transmission is always available for replay. If a swap is elected, that recorded interval in the memory may be provided for display and the next succeeding material of the same duration may be recorded and thereafter provided for display, in one embodiment of the present invention. The information from the monitored channel may be recorded using conventional storage devices including hard disk drives as one example.

Otherwise, a check is made in diamond 64 to see if any new swap requests have been made. In other words, a check is made to determine whether the user wishes to input information about swap options which the user may like to invoke. If so, this information is transmitted back to the broadcaster as indicated in block 66 or stored on the receiver. Otherwise, the currently displayed transmission is allowed to continue, as indicated in block 68.

Figure 4:
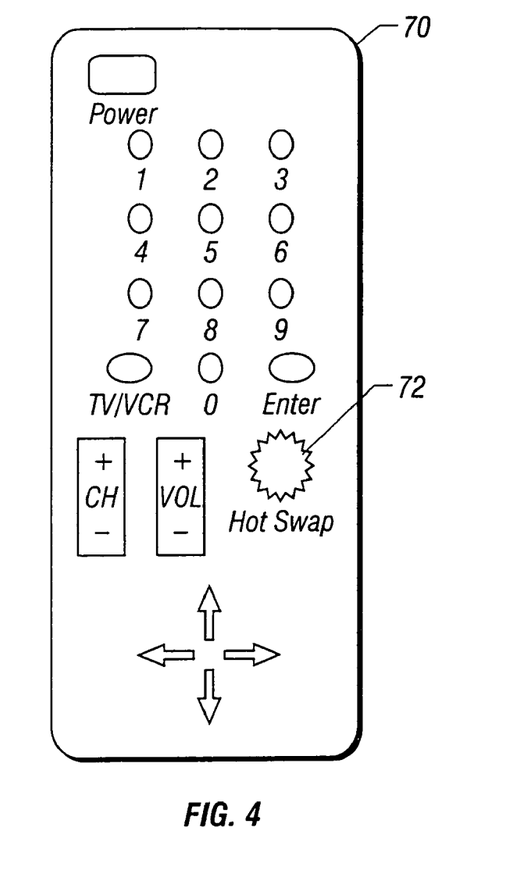
FIG. 4 is a front elevational view of a remote control useful with the receiver shown in FIG. 1.

A remote control 70 (which may be used as the swap input device 32 of FIG. 1), shown in FIG. 4, may be coupled to receiver 30. The control 70 may provide a power on/off button, channel input buttons, selectors for changing channels and volume, and the ability to select between different receive options such as a television option and a video cassette recorder (VCR) option. In addition, the receiver 70 includes a hot swap button 72 which sends a signal to the receiver to indicate that the user would like to invoke the swap option and to switch to the other program.

Figure 6:
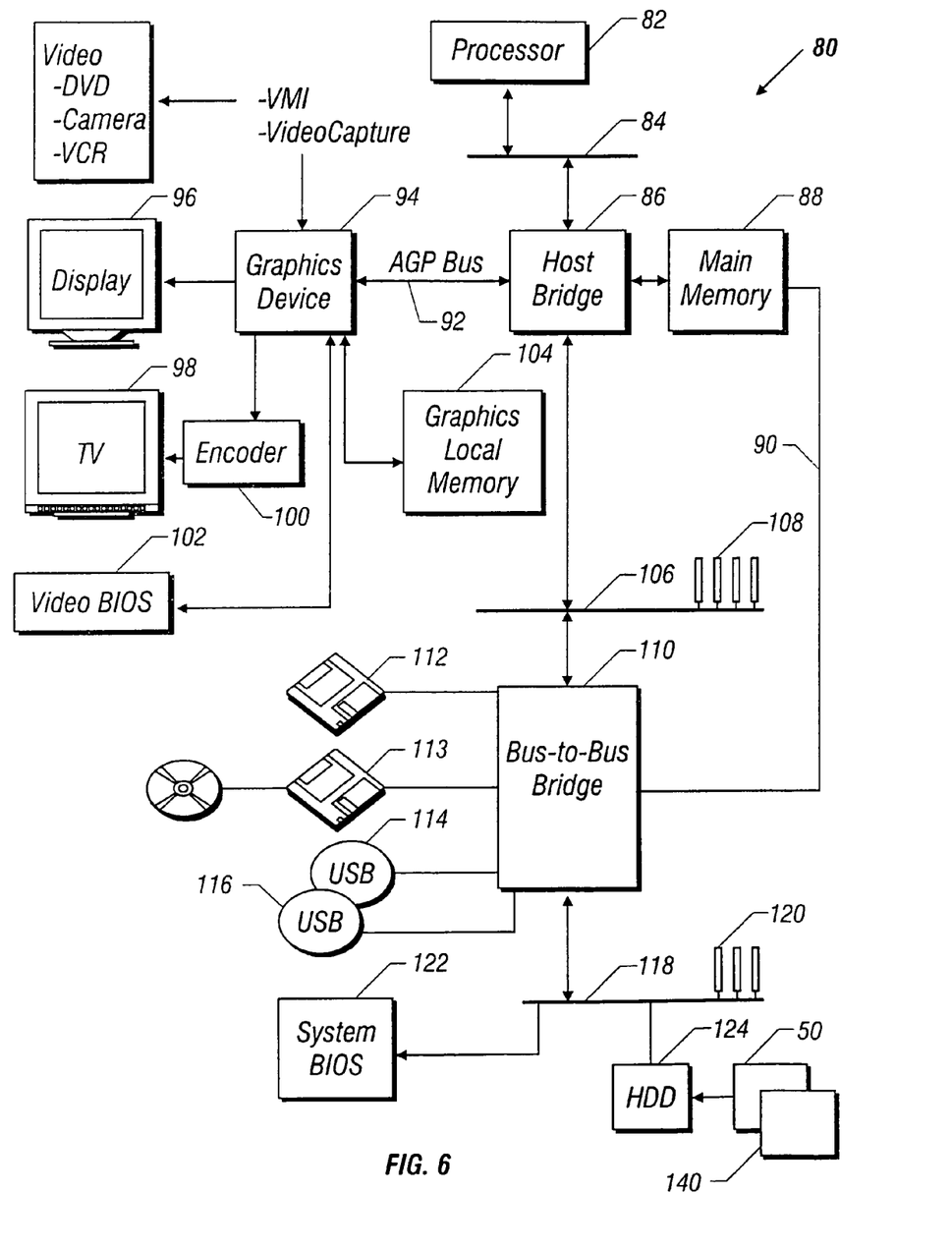
FIG. 6 is a block diagram of an embodiment of the receiver shown in FIG. 1.

An example of a computer system 80 for implementing the receiver 30 shown in FIG. 1 may include a processor 82, as shown in FIG. 6. The receiver 30 may be a computer system connected to a television receiver, or a set-top computer system which is designed for use with a television system. Alternatively, the receiver 30 may be a television or a multimedia system or another appliance-like device.

The processor 82 is coupled to a host bus 84 which in turn is coupled to a host bridge 86. The host bridge 86 couples a main memory 88, an accelerated graphics port (AGP) bus 92 and a graphics device 94. The main memory 88 may couple a system management (SM) bus 90.

The graphics device 94 receives video inputs and provides outputs to a display monitor 96 or to a television receiver 98 through a encoder 100. The graphics device receives information from a graphics local memory 104 and a video basic input/output system (BIOS) 102. The video inputs may include television broadcasts, camera or VCR inputs as well as digital video disk (DVD) information.

The host bridge 86 is coupled to a bus 106 which may receive a plurality of peripheral devices in slots 108. The bus 106 may also be coupled to a bus-to-bus bridge 110 which couples still another bus 118. The bus 118 may also include peripheral device receiving slots 120. The bus-to-bus bridge 110 may couple to a plurality of ports 112, 113, 114 and 116 which may connect to additional storage devices, such as floppy disc drives, compact disk drives, or other peripherals, for example, through universal serial bus (USB) ports. The bus 118 may receive a hard disk drive 124 which stores software 50 and 140. The bus 118 may also be connected to the system basic input/output system (BIOS) 122.

The hard disk drive 124 (medium) may be utilized to automatically store the transmission on the monitored channel in a first in last out sequence. In one embodiment of the present invention, a predetermined time interval is automatically queued for display when an event occurs. For example, the system may always store forty-five seconds of content in a first in last out sequence. When an event is detected, that stored information may be queued for display. In another embodiment of the present invention, when the stored information is queued for display, the succeeding interval is recorded while the original stored information is being displayed. The second stored information is thereafter queued for display so that the viewer can view a short portion immediately before and after the triggering event.

It should be understood that the computer system 80 is only meant to be an example and any number of computer designs may be utilized to implement embodiments of the present invention. The system 80 may be used as the receiver and/or as the broadcast encoder 20 in some embodiments.

The graphical user interfaces described herein are visual representations of memory states. The graphical user interface displayed on a display 96 or 98 may be stored in one or more of the memory 104, 88 and 124, for example.

Figure 7:
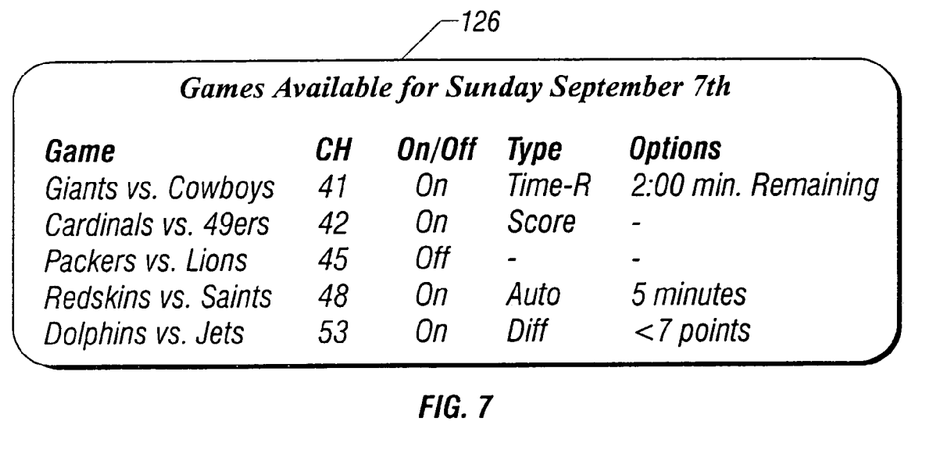
FIG. 7 is another display screen which may be used with the receiver shown in FIG. 1.

A swap options prompt display screen 126, shown in FIG. 7, may be utilized by the receiver 30 to either display the selected prompts or to receive inputs of selected prompts from the user. In the example illustrated by screen 126, a plurality of football games that are televised at the same or similar times are automatically displayed for a given day. The screen 126 indicates the channel for each game and an on/off indication to indicate whether or not the user wishes to have the swap option activated. For example, in the illustrated embodiment, the Packers vs. Lions game has the swap option "off" while the remaining games have invoked swap option.

With respect to the Giants vs. Cowboys game, the option "Time-R" indicates that the user will be prompted with two minutes remaining that the Giants vs. Cowboys game is about to end. Similarly, in the Cardinals vs. 49ers entry, the prompt is set to occur when a team scores. Meanwhile, for the Redskin vs. Saints game, the prompt is automatically provides every five minutes. For the Dolphins vs. Jets game, the DIFF prompt is invoked. This prompt is actuated when the score differential is less than 7 points. In each case when the condition arises, the user receives a screen prompt of the type shown in FIG. 5 and is given the option to hot swap by activating a button 72 on the control 70 to switch to the other broadcast.

With some swapping options, such as those that make use of score or difference in score, a monitoring operation may be done with respect to the closed caption information that may be broadcast with the television program, or in connection with data transmitted for example in the vertical blanking interval. Techniques are available for monitoring the closed caption information and for reporting when a given event occurs. The closed caption text may be scanned and searched for given preprogrammed words. When these words occur an event may be triggered. Thus, the word "touchdown" or numerical information may be scanned to provide a score differential which would then activate the present system.

One device for achieving the closed caption text scanning is the All-In-Wonder from ATI Technologies, Inc. Another technique is to convert the audio to text and use optical character recognition scanning to locate the search terms.

Alternatively, the analysis may be undertaken at the broadcast encoder 20. When a given event occurs and is entered at the broadcast encoder, the broadcast encoder 20 may transmit the necessary information in the form of scripts for example, to create the screen prompt. One technique for providing the scripts is disclosed in U.S. Pat. No. 5,818,441 assigned to Intel Corp.

Figure 8:
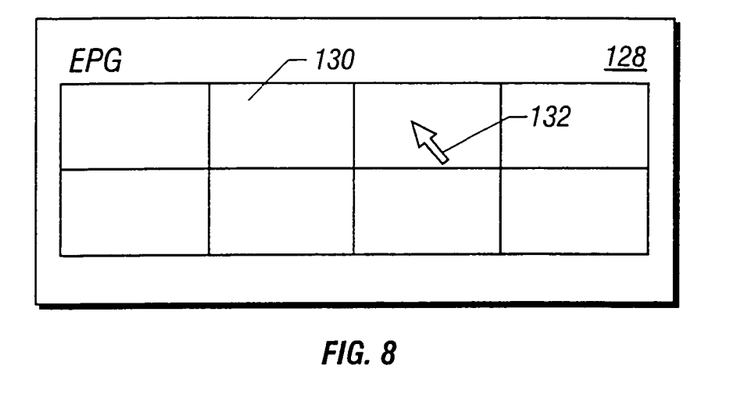
FIG. 8 is a depiction of a display screen in accordance with another embodiment of the present invention.

The desired swap options can be implemented using an electronic programming guide (EPG) as illustrated in FIG. 8. In an EPG, a plurality of programs are illustrated by graphical user interface blocks 130 on an EPG screen 128 displayed by the receiver 30. This screen may be initiated by operating a given button on a remote control 70, for example. A cursor 132 may be provided to allow the user to select, through the remote control, a desired program.

Figure 9:
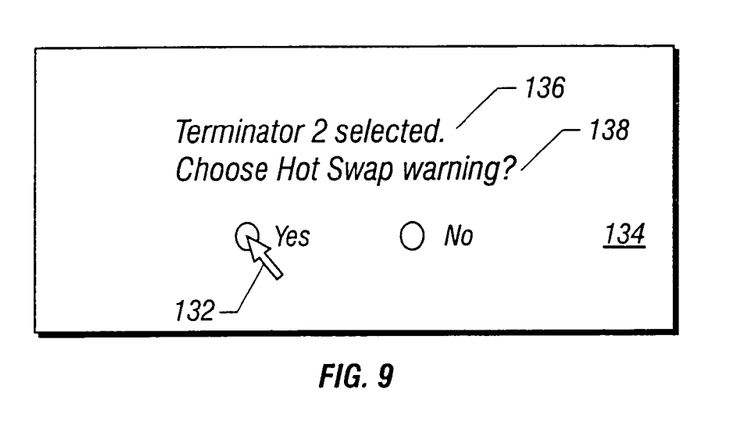
FIG. 9 is a depiction of a display screen in accordance with the embodiment shown in FIG. 8.

When the user selects a given program on the EPG screen 128, the user may be prompted to indicate whether a hot swap feature is desired. For example, as shown in FIG. 9, after the block 130 is selected by clicking the cursor 132, the user is automatically advised of the program selected, as indicated at 136, and can be queried, as indicated at 138, as to whether one or more hot swap options are desired. In the illustrated example with screen 134, a simple "yes" or "no" response is requested, for example, to implement the two minute warning hot swap prompt discussed previously.

Figure 10:
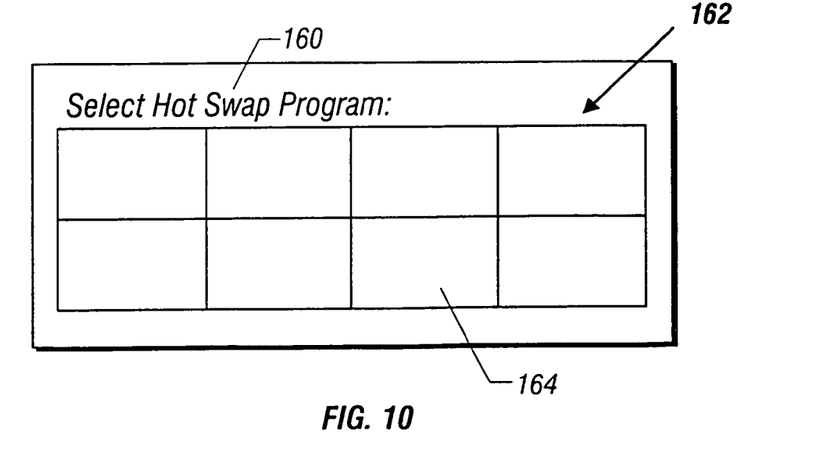
FIG. 10 is another depiction of a display screen useful with the embodiment shown in FIG. 8.

Turning now to FIG. 10, if a hot swap selection is made, as indicated in FIG. 9, the user may be provided with a plurality of program options in graphical user interface boxes 164 on a hot swap selection screen 160. The user may be asked to indicate which program, represented by a box 164, is the one that will be selected if the hot swap is invoked. The user may make the selection by mouse clicking on the appropriate box 164.

Figure 11:
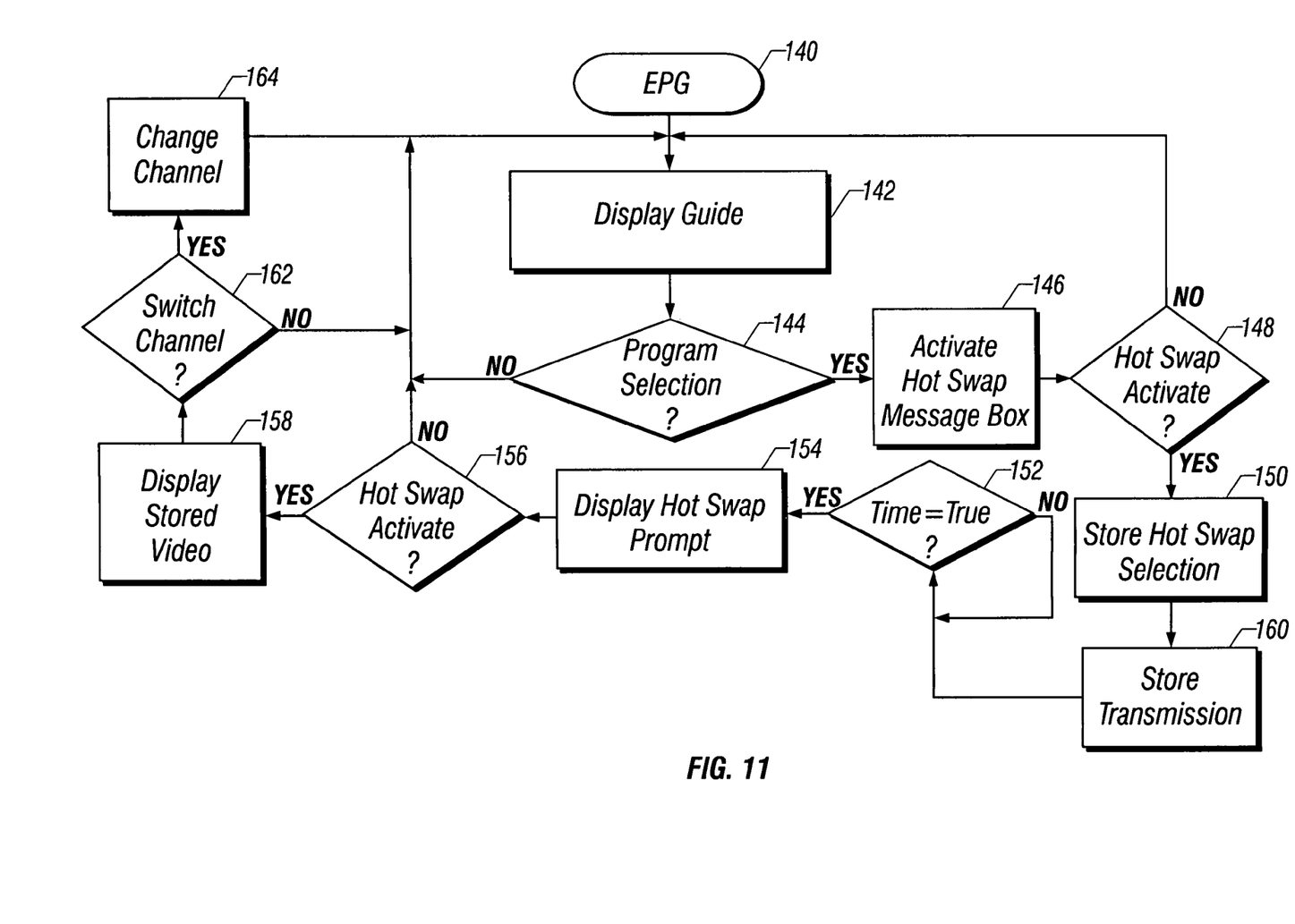
FIG. 11 is a flow chart for software which may be implemented on the receiver of FIG. 1 and in connection with the embodiment shown in FIG. 8.

An example of a flow for implementing the software 140 for providing the functionality with an EPG begins with the display of the programming guide, such as the one illustrated in FIG. 8, as indicated in block 142 in FIG. 11. After the display of the EPG, a check determines whether a transmission, such as a television program has been selected, as indicated in diamond 144. If so, a hot swap message box (for example as illustrated in FIG. 9) is provided as indicated in block 146 in FIG. 11. If the user selects the hot swap option (as indicated by the "yes" prong of diamond 148) the hot swap selection may be stored as suggested in block 150. The storage could occur in the local receiver or it could be transmitted to the broadcaster in a broadcaster implemented system and stored in the database 26.

If a swap selection is made, the video which is received by the receiver may be continuously stored, in one embodiment of the present invention, as indicated in block 160. For example, a predetermined time period may be stored in a first in last out sequence. As a result, a predetermined period is always available for viewing when a triggering event is detected.

Next, in diamond 152, a query determines whether the time equals the predetermined time which invokes the hot swap prompt. If so, the hot swap prompt is displayed as indicated in block 154. If the user selects the hot swap option, as indicated in diamond 156, the portion of a second transmission which immediately preceded the swap event, is then queued for display. In the case where the information is provided from the broadcast head end, this information is automatically provided over the broadcast transport. In the case where the information is stored on the local receiver, the stored information in the first in last out memory is automatically queued for display. In one embodiment of the present invention, a predetermined period before and after the triggering event are displayed.

In one embodiment of the invention, after viewing this information, the user can then make the decision about whether change the channel or to remain with the original channel as indicated in diamond 158.

In other embodiments, instead of checking the time as illustrated by diamond 152, a check may be made of another transmission to determine if certain selected words have been uttered. If so, as determined by monitoring the closed caption script for example, the hot swap prompt may be displayed. In addition, embodiments of the invention may be useful in monitoring for the start of a show on a different channel than one being viewed.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An medium for storing instructions that, if executed, enable a processor-based receiver to:

display a user interface on a display coupled to the receiver, said user interface including a listing of a plurality of programs to be televised on a given day at overlapping times, an indicator associated with each program to indicate whether the particular program should be monitored for an event, and if a particular program is to be monitored, another indicator to indicate the type of event for which the receiver is to monitor;

simultaneously receive the number of video transmissions on the receiver corresponding to the number of televised programs indicated, in said user interface, to be monitored;

tune said receiver to display a first video transmissions and to monitor and to store the number of received video transmissions, each video transmission in said number of received video transmissions to be monitored for the corresponding event indicated in said user interface;

in response to detecting an event in one of the number of received video transmissions, stop the display of the first video transmission to store the first video transmission from the stop of the display and display the one of the number of received video transmission in which the event was detected, the display of said one of the number of received video transmissions from a predetermined time before the occurrence of the event; and in response to detecting an event in the first video transmission, display at least a portion of the first video transmission that was stored after detecting the event in the one of the number of received video transmissions; and store more than one user-selected option corresponding to a type of event for monitoring and display the user interface listing a plurality of programs, the programs of the same genre, said user interface to enable the user to select whether a given listed program should be monitored.

2. The medium of claim 1 further storing instructions that, if executed, enable the receiver to store a plurality of video transmissions and monitor the transmissions for a user-selected option.

3. The medium of claim 1 further storing instructions that, if executed, enable the receiver to queue said one of the number of received video transmissions from a time of about forty-five seconds prior to the occurrence of the event.

4. The medium of claim 1 further storing instructions that, if executed, enable the receiver to automatically queue the stored one of the number of received video transmissions in response to detecting the event.

5. The medium of claim 1 further storing instructions that, if executed, enable the receiver to display a notification of the occurrence of the event and, in response to user input queue the stored one of the number of received video transmissions.

6. The medium of claim 1 further storing instructions that, if executed, enable the receiver to monitor and store said one of the number of received video transmissions while being displayed.

7. The medium of claim 1 further storing instructions that, if executed, enable the receiver to display the queued one of the number of received video transmissions from a user-defined time before the occurrence of the event.

8. A receiver comprising:
a processor;
a display device coupled to the processor; and
a medium available to said processor, said medium storing instructions that, if executed, enable the processor to receive the selection of one television program from an electronic program guide that is displayed on said display device, in response to receiving the selection, display on said display device a graphical user interface other than the electronic program guide, said graphical user interface including a plurality of other television programs that are to be broadcast while the one television program is being broadcast, in response to the selection of at least one of the other television programs, receive, monitor, and store a first video transmission corresponding to the selected at least one of the other television programs while said receiver is tuned to display a second, different video transmission corresponding to the one television program, in response to detecting an event in said first video transmission, replace the display of said second video transmission with the display of said first video transmission from a predetermined time before the occurrence of the event and simultaneously store said second video transmission, and in response to another event, replace the display of said one video transmission with the display of at least a portion of said second video transmission that was stored while said first transmission was displayed; and display another user interface on said display device, said other user interface other than said graphical user interface, said other user interface including a listing of a plurality of programs televised on a given day at overlapping times, an indicator associated with each program to indicate whether the particular program should be monitored for an event, and if a particular program is to be monitored, another indicator to indicate the type of event for which the receiver is to monitor.

9. The receiver of claim 8 including a television system coupled to the receiver, and wherein the receiver is a set-top box.

10. The receiver of claim 8 further storing instructions that, if executed, enable the processor to store criteria for more than one type of event for monitoring and display the other user interface including a listing of a plurality of programs, of the same genre, said other user interface to enable the user to select whether a given listed program should be monitored.

11. The receiver of claim 8 further storing instructions that, if executed, enable the processor to display the other user interface including a listing of a plurality of sporting events, and wherein the types of events for monitoring includes at least one of a point differential or the time remaining in a sporting event.

12. A receiver comprising:
a processor;
a display device coupled to the processor; and
a medium available to said processor, said medium storing instructions that, if executed, enable the processor to receive the selection of one television program from an electronic program guide that is displayed on said display device, in response to receiving the selection, display on said display device a graphical user interface other than the electronic program guide, said graphical user interface including a plurality of other television programs that are to be broadcast while the one television program is being broadcast, in response to the selection of at least one of the other television programs, receive, monitor, and store a first video transmission corresponding to the selected at least one of the other television programs while said receiver is tuned to display a second, different video transmission corresponding to the one television program, in response to detecting an event in said first video transmission, replace the display of said second video transmission with the display of said first video transmission from a predetermined time before the occurrence of the event and simultaneously store said second video transmission, and in response to another event, replace the display of said one video transmission with the display of at least a portion of said second video transmission that was stored while said first transmission was displayed; and store criteria for more than one type of event for monitoring and display the other user interface including a listing of a plurality of programs, of the same genre, said other user interface to enable the user to select whether a given listed program should be monitored.

13. The receiver of claim 12 including a television system coupled to the receiver, and wherein the receiver is a set-top box.

14. The receiver of claim 12 further storing instructions that, if executed, enable the processor to display the other user interface including a listing of a plurality of sporting events, and wherein the types of events for monitoring includes at least one of a point differential or the time remaining in a sporting event.

15. A receiver comprising:
a processor;
a display device coupled to the processor; and
a medium available to said processor, said medium storing instructions that, if executed, enable the processor to receive the selection of one television program from an electronic program guide that is displayed on said display device, in response to receiving the selection, display on said display device a graphical user interface other than the electronic program guide, said graphical user interface including a plurality of other television programs that are to be broadcast while the one television program is being broadcast, in response to the selection of at least one of the other television programs, receive, monitor, and store a first video transmission corresponding to the selected at least one of the other television programs while said receiver is tuned to display a second, different video transmission corresponding to the one television program, in response to detecting an event in said first video transmission, replace the display of said second video transmission with the display of said first video transmission from a predetermined time before the occurrence of the event and simultaneously store said second video transmission, and in response to another event, replace the display of said one video transmission with the display of at least a portion of said second video transmission that was stored while said first transmission was displayed; and display the other user interface including a listing of a plurality of sporting events, and wherein the types of events for monitoring includes at least one of a point differential or the time remaining in a sporting event.

16. The receiver of claim 15 including a television system coupled to the receiver, and wherein the receiver is a set-top box.

* * * * *